(12) United States Patent
Wasinger

(10) Patent No.: US 6,197,206 B1
(45) Date of Patent: Mar. 6, 2001

(54) PROCESS AND APPARATUS FOR PURIFYING METHYL TERT-BUTYL ETHER CONTAMINATED WATER

(76) Inventor: Eric M. Wasinger, 7977 Garden North Dr., San Antonio, TX (US) 78266-1714

( * ) Notice: Subject to any disclaimer, the term of this patent is extended or adjusted under 35 U.S.C. 154(b) by 0 days.

(21) Appl. No.: 09/156,799

(22) Filed: Sep. 17, 1998

(51) Int. Cl.⁷ ..................................................... C02F 1/78
(52) U.S. Cl. ........................... 210/760; 210/765; 210/908
(58) Field of Search ..................................... 210/758, 760, 210/765, 908

(56) References Cited

U.S. PATENT DOCUMENTS

| | | | |
|---|---|---|---|
| 3,445,001 | * 5/1969 | La Raus | 210/98 |
| 5,399,267 | * 3/1995 | Wang et al. | 210/604 |
| 5,505,856 | * 4/1996 | Campen et al. | 210/668 |
| 5,545,330 | * 8/1996 | Ehrlich | 210/703 |
| 5,562,822 | * 10/1996 | Furness, Jr. et al. | 210/188 |
| 5,707,528 | * 1/1998 | Berry | 210/663 |

* cited by examiner

Primary Examiner—David A. Simmons
Assistant Examiner—Betsey Morrison Hoey
(74) Attorney, Agent, or Firm—John Lezdey & Assoc

(57) ABSTRACT

There is provided an efficient and effective method and apparatus for purifying methyl-tert butyl ether contaminated water by bubbling into the water an oxidizing gas and then stripping the oxidizing gas and MTBE from the water. A pressurized container is used to create microbubbles and to promote oxidation.

9 Claims, 5 Drawing Sheets

PROCESS AND APPARATUS FOR PURIFYING METHYL TERT-BUTYL ETHER CONTAMINATED WATER

FIELD OF THE INVENTION

This invention relates to a process and apparatus for the purification of water contaminated with methyl tert-butyl ether (MTBE) with air and/or a gas containing ozone. Optionally, there is provided a pressurized container and gas stripping means. The contaminated water may come available from lake water, ground water and underground water supplies.

BACKGROUND OF THE INVENTION

MTBE is a chemical compound that is manufactured for primary use in gasoline. MTBE, a colorless, flammable liquid with a turpentine-like odor, is highly water soluble, highly flammable, and extremely volatile. It is resistant to biodegradability in either aerobic or anaerobic conditions. MTBE is a common component in reformulated fuels developed to reduce smog and meet Clean Air Act goals and has been used in gasoline since 1979. The characteristics of MTBE are unlike those of other gasoline constituents and solvents. MTBE is highly soluble and migrates quickly with groundwater. Groundwater in equilibrium with gasoline containing 15 percent MTBE could contain as much as 9,600 ppm MTBE. It does not significantly adhere onto soil particles, and it does not appear to readily biodegrade in the environment.

MTBE is more difficult and more expensive to remove from water than other chemicals found in gasoline. Also, MTBE plumes can appear as discontinuous slugs. It moves more quickly through soil than most gasoline components, and its plumes tend to expand more rapidly. MTBE has been used in cold climates in the United States since 1979 as a de-icer. The Environmental Protection Agency (EPA) has tentatively classified MTBE as a possible human carcinogen, and in February 1991 the California EPA office of Environmental Health Hazard Assessment (OEHHA) established an interim action level of 35 ppb for MTBE. Depending on the state, regulatory requirements for MTBE range from 20 to 200 ppb.

MTBE is thought to get into surface waters such as lakes and reservoirs from the use of motorized watercraft. It may also travel into these waters in polluted runoff, or it may be deposited from the atmosphere by rainwater or other means. MTBE can get into groundwater from leaking underground fuel storage tank systems and leaking petroleum pipelines.

Available literature suggests that the treatment alternatives for removing MTBE from groundwater include pump and treat, air stripping, GAC absorption, and advanced oxidation processes.

Ethers under normal conditions are non-reactive and, in the case of MTBE, remain unchanged in soil and groundwater environments. However, oxidation by hydroxyl radical occurs readily with ethers. As long as the hydroxyl radical is in excess, this reaction will go to completion for all ethers, hydrocarbons or chlorinated solvents under controlled conditions.

It has long been known to ozonate water in order to oxidize pathogens and any other oxidizable organic or inorganic material that might be present in contaminated water. Ozone is a semistable gas formed of three oxygen atoms, instead of the two atoms that form oxygen gas. Ozone is most typically produced by an electrical arc discharged through air causing oxygen atoms to combine with an oxygen free radical that is formed. Ozone rapidly undergoes reaction to revert to more stable oxygen, releasing an oxygen free radical in the process. Two such free radicals can combine to form an oxygen molecule or the free radicals can oxidize an oxidizable substrate.

Ozone is fast emerging as the most efficient and ecologically sound oxidant to treat both organic and inorganic substances. Ozone has been used for water treatment for over 100 years, and is a preferred means of disinfecting potable waters. Many new applications of ozone are being evaluated.

A natural ingredient of the Earth's upper atmosphere, ozone ($O_3$) is a three-atom allotrope of oxygen ($O_2$) and exists in a gaseous form at ambient conditions. Ozone is such an aggressive oxidant, it is second only to fluorine in electronegative oxidation potential. However, unreacted ozone decomposes in a matter of hours to simple molecular oxygen and therefore cannot be stored. It must be produced on-site and destroyed by burning.

DESCRIPTION OF THE PRIOR ART

It is well known in the art to use ozone to treat contaminated substances. Land et al, in U.S. Pat. No. 5,615,974, which is incorporated herein by reference, teaches the use of ozone to treat subsurface contamination. Specifically, according to Land et al, chemical oxidation is a process in which the oxidation state of a substance is increased. Oxidizing agents usually supply oxygen as the electron acceptor in oxidation reactions. In the process of Land et al, any oxidant is suitable but the preferred oxidant is hydrogen peroxide.

In an embodiment of Land et al, ozone, with or without Fenton's reagent, may be the oxidant. Fenton's reagent is a broad term used to describe that compound which results from the combination of an acidic solution, such as hydrogen peroxide, with a ferrous salt. The oxidization reaction with ozone generates the "hydroxyl radical" (OH.) and this hydroxyl radical is believed to degrade and volatilize contaminants, such as petroleum hydrocarbons and volatile, semi-volatile and nonvolatile organic compounds. Fenton's reaction generates heat and the heat generated helps to volatilize contaminants which might not initially react.

It is also known in the art to use ozone to clean water. Typical systems using ozone can be found in U.S. patents to Teller et al., U.S. Pat. No. 4,021,347, Laraus, Nos. 4,104,166 and 4,250,040, Tamir No. 4,804,478 and Brown, No. 5,004,537. The referenced patents to Teller et al., Laraus, Tamir and Brown are incorporated herein by reference. Ozone is 600 to 3000 times more active against bacteria than chlorine in similar concentrations. In addition to being more effective than chlorine, ozone does not exhibit the drawbacks of chlorine, such as odor and/or skin irritation.

It is also known in the art to use both ozone and ultraviolet radiation to purify water, as taught in U.S. patents to Engelhard, U.S. Pat. No. 5,709,799, Gastman et al., No. 5,711,887, Dadd, No. 4,230,571, and Campen et al., No. 4,230,571. The reference patents to Engelhard, Gastman et al., Dadd, and Campen et al. are incorporated herein by reference.

The use of carbon as a filter or a catalyst is also known in the art. Specifically, MTBE contaminated water has been passed through carbon beds. Good results can be obtained using activated carbon (surface area 400–800 $m^2/g$). Alumina and silica can also be used. In general, solid components and mixtures thereof can be used which have an absorption capability or affinity to the toxic component to be treated. In practice, the solid filter preferably has a surface area of at least 50 $m^2/g$ and a pore volume greater than 0.1 $cm^3/g$. However, carbon beds alone are not effective.

The prior art, however, does not teach an efficient and effective use of ozone in a pressurized environment to purify water that is becoming increasingly more contaminated with potentially dangerous MTBE.

SUMMARY OF THE INVENTION

The current invention teaches an efficient and effective apparatus and method for purifying MTBE contaminated water by subjecting the water to an oxidant such as ozone or ozone enriched fluid and then stripping off the oxidized products.

Advantageously, the ozone or an ozone enriched gas is delivered as a stream of microbubbles to provide a greater surface area of ozone contact. Placing the contaminated water and ozone in a pressurized environment increases the oxidation reaction.

DESCRIPTION OF THE PREFERRED EMBODIMENTS

Figure 1:
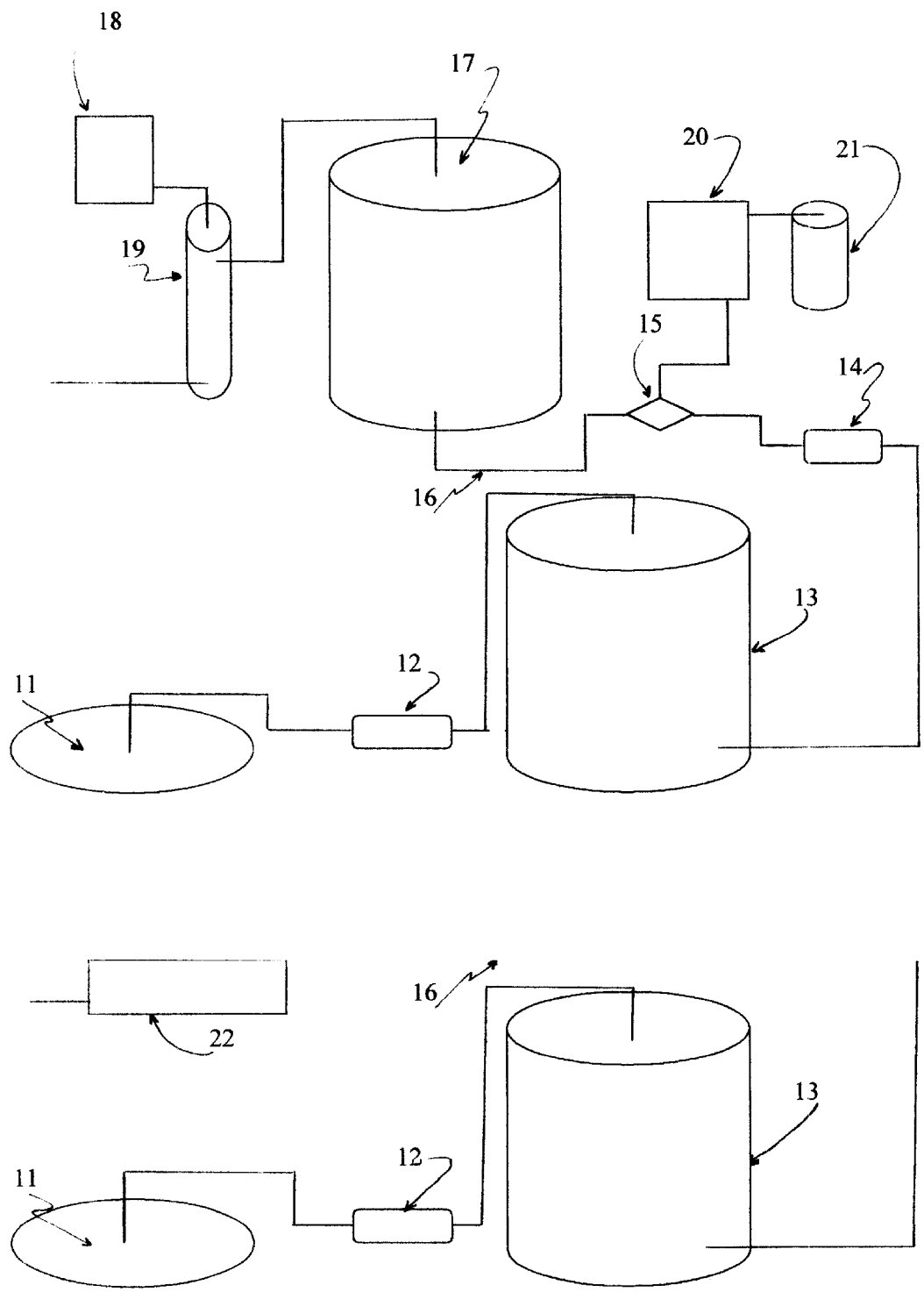
FIG. 1 is a schematic diagram of the invention in a preferred embodiment.

Referring to FIG. 1, there is illustrated a process and apparatus 10 for the purification of MTBE contaminated water 11 within the scope of the present invention. The water 11 can come from lake water, ground water and underground water supplies, such as aquifers and the like.

The MTBE contaminated water 11 is moved from its source by means of a first water pump 12 into a pretreatment storage tank 13. The pretreatment storage tank 13 is equipped with a low level shut down device (not shown). The MTBE contaminated water is moved from the pretreatment tank by means of a second water pump 14. Air or ozone enriched air from a source 20,21 is bubbled into the flow stream of MTBE contaminated water 11 by means of a venturi 15. Preferably, the bubbles are microbubbles which have a size of about 1 to 4 microns in diameter. Bubble size is determined by the pressure in pipe 16 between the venturi 15 and the pressure in tank 17. Ozone may be generated by any ozone generating machine, or particularly by the Osmonics Model TS-21 Ozone Pilot System, marketed by Osmonics, Inc., Phoenix, Ariz. with a pressurized tank and gas stripper. The air or ozone enriched air along with the MTBE contaminated water is then forced into the pressurized contact tank 17 through line 16 by the pressure generated by the water pump 14. The contact time is determined by the MTBE contamination level in the contaminated water 11. The residual ozone is driven from the water as a result of the gas/air stripper 19. The residual gas is moved through ozone resistant piping to the destruction unit 18. The destruction unit 18 can be a type that includes a heating element along with various types of carbon beds to remove any remaining residual ozone and MTBE before discharge into the atmosphere. The destruction unit 18 may also consist of an open flame or high temperature heating element capable of burning any residual oxidation products and destroying any residual gases.

The pressure in the pressurized contact tank 17 causes the ozone to maintain micro sized bubbles, which allows for more surface area contact with the MTBE contaminated water. The pressure is also believed to speed up the oxidation of the MTBE.

The amount of time required depends on the concentration of MTBE and ozone in the water. The treated water flows out of the bottom of the unit 19 to receive further treatment with ozone or carbon filtration or be returned to the source and the remaining gas/air escapes from the top of the gas stripper 19 to the destruction unit 18.

In another preferred embodiment, the ozone gas source for the ozone enriched air comes from the gas stripper 19 by a conduit (not shown) that routes the ozone gas bypassing the destruction unit 18 to the venturi 15.

Figure 2:
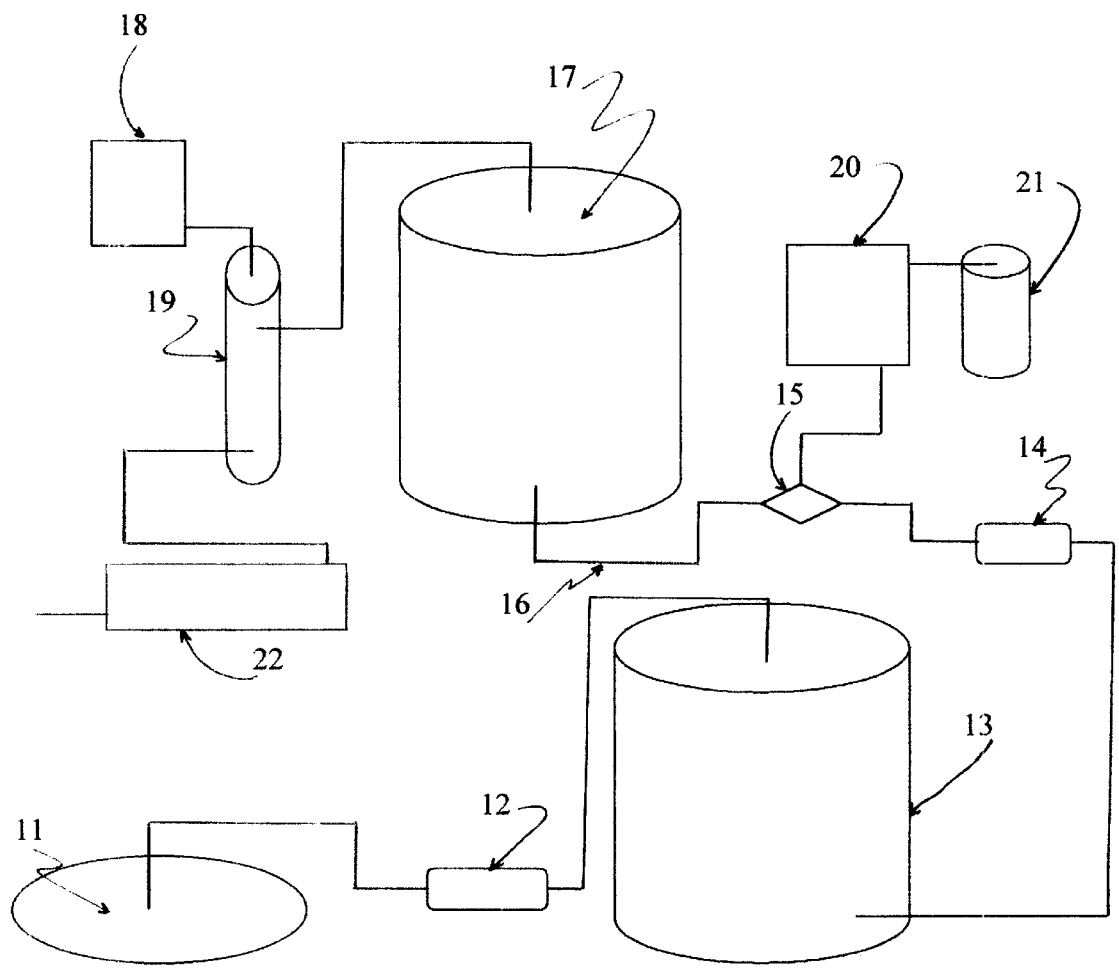
FIG. 2 is a schematic diagram of the invention in FIG. 1 in combination with a carbon bed filter.

In yet another embodiment, as illustrated in FIG. 2, a carbon bed 22 may be placed after the gas/air stripper 19 to remove any residual MTBE remaining in the water. In this embodiment, the ozone containing water passing through the carbon bed will also destroy the MTBE on the carbon bed and prolong its useful life. This embodiment is useful in situations that demand high flow rates of MTBE contaminated water and reduction in ozone contact time.

Figure 3:
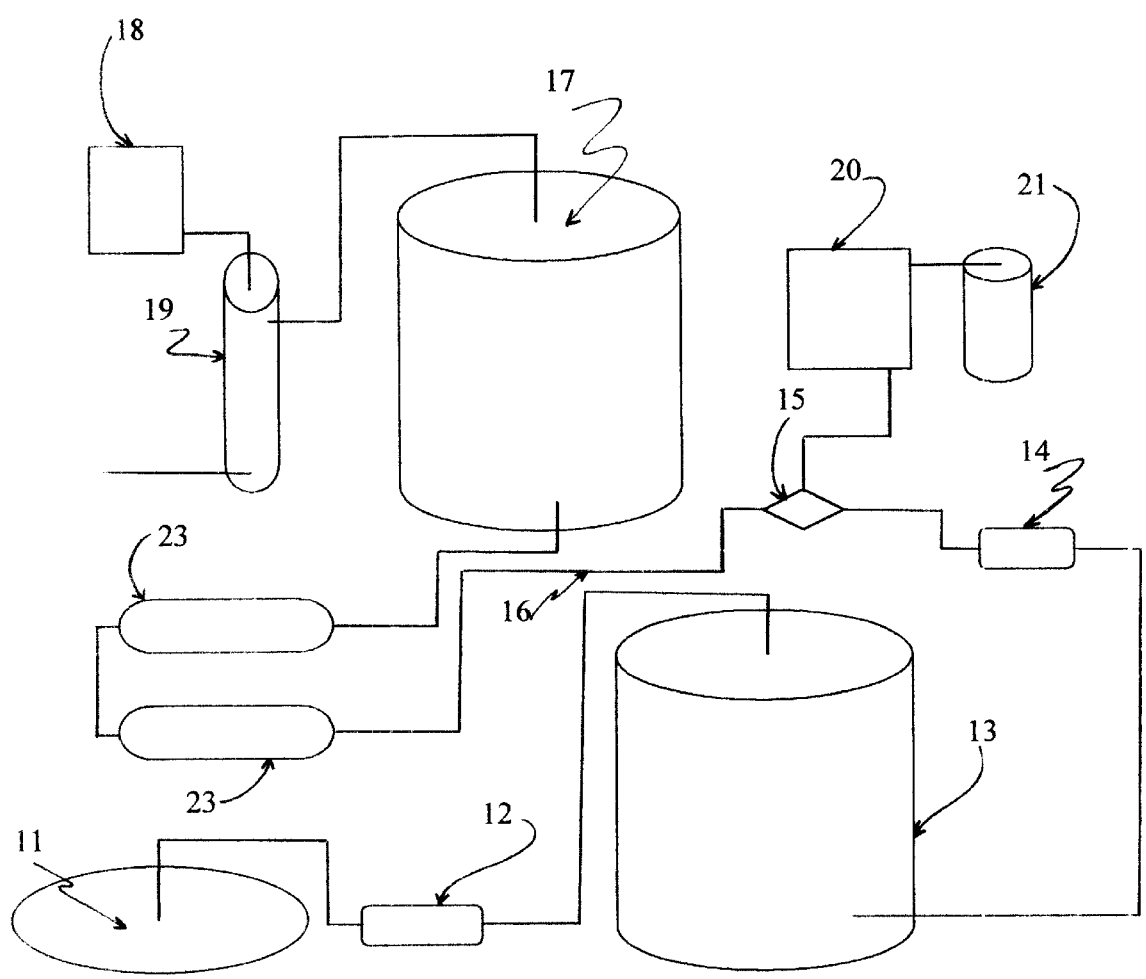
FIG. 3 is a schematic diagram of the invention in FIG. 1 in combination with U.V. light treatment of the contaminated water.

In yet another embodiment, as illustrated in FIG. 3, after the venturi 15, the air oxygen or ozone enriched air, oxygen along with the MTBE contaminated water is then forced through a series of ultra violet light chambers 23, for additional oxidation treatment, whereby, the UV light interacts with the free radical generated by the ozone before entering the pressurized contact tank 17.

In a preferred embodiment, the process utilizes a plurality of pressurized contact tanks with sufficient pressures to cause the ozone to maintain micro sized bubbles, which allows for more surface area contact with the MTBE contaminated water. The pressure exerted on the MTBE contaminated water stream with ozone while in the pressurized contact tank 17 is between about 3 psi and 30 psi, more preferably, about 20 psi. To achieve higher pressure, a Cromwell pump may be employed, in the event more pressurized contact tanks are used producing higher pressure requirements. The pressure also speeds up the oxidation of the MTBE. The number of pressurized contact tanks is dependent on the concentration of MTBE and ozone in the MTBE contaminated water, desired flow rates and desired treatment level of the MTBE contaminated water.

Figure 4:
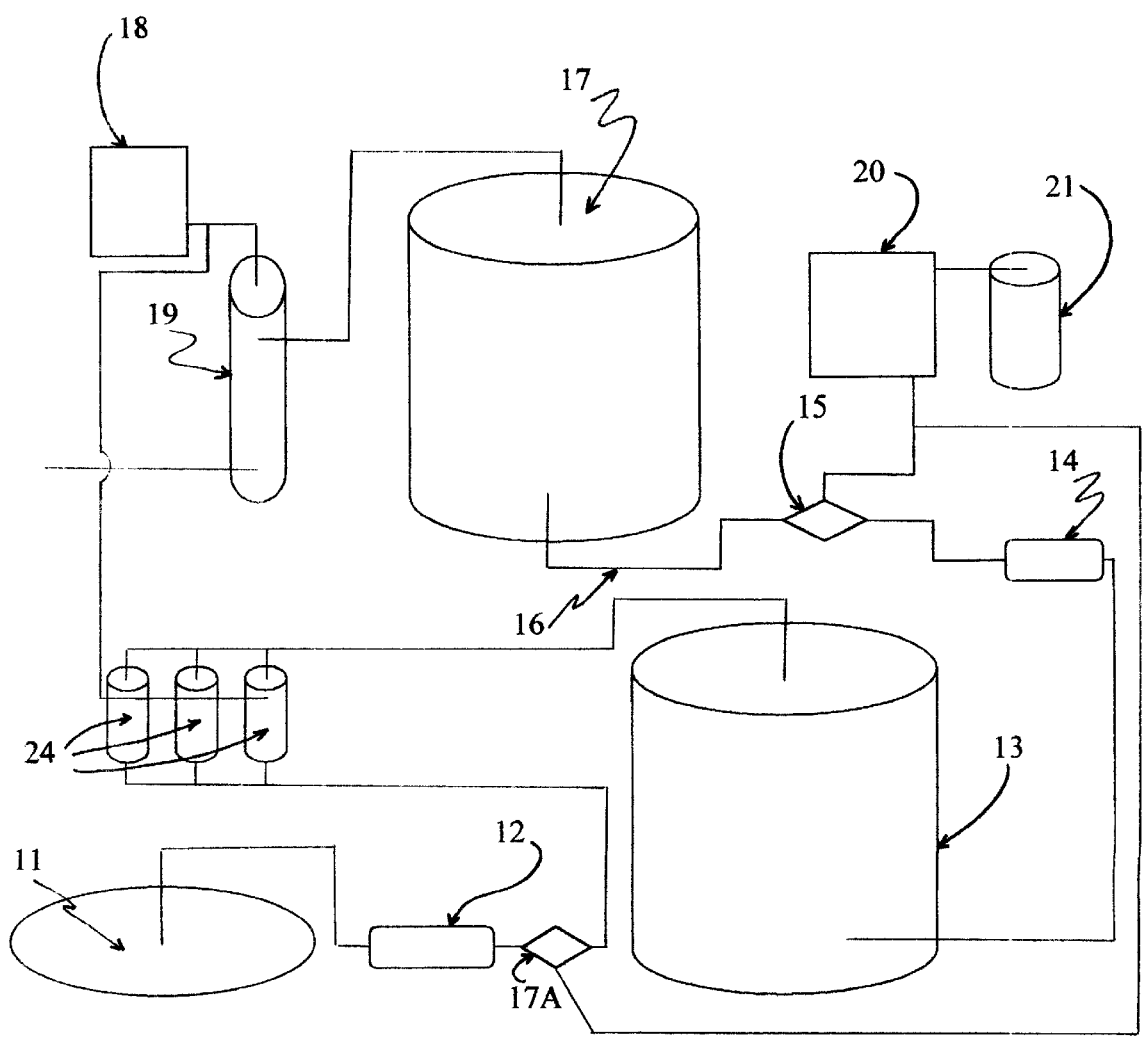
FIG. 4 illustrates the invention in FIG. 1 in combination with addition gas/air strippers.

In yet another embodiment, as illustrated in FIG. 4, the MTBE contaminated water 11 is moved from its source by first a water pump 14. Air, oxygen or ozone enriched air, oxygen is drawn into the flow stream of MTBE contaminated water 11 by means of a venturi 17A. The air, oxygen or ozone enriched air, oxygen along with the MTBE contaminated water is then forced through a series of gas/air strippers 24. The residual ozone along with MTBE is driven from the water as a result of the gas/air strippers 24. The residual ozone and MTBE is then moved through ozone resistant piping to destruction unit 26, which consists of a flame capable of destroying the ozone and MTBE residual. The MTBE water, now containing lower levels of MTBE because of this process is then forced into the storage tank 13 for continuation of the process as illustrated in FIG. 1.

Figure 5:
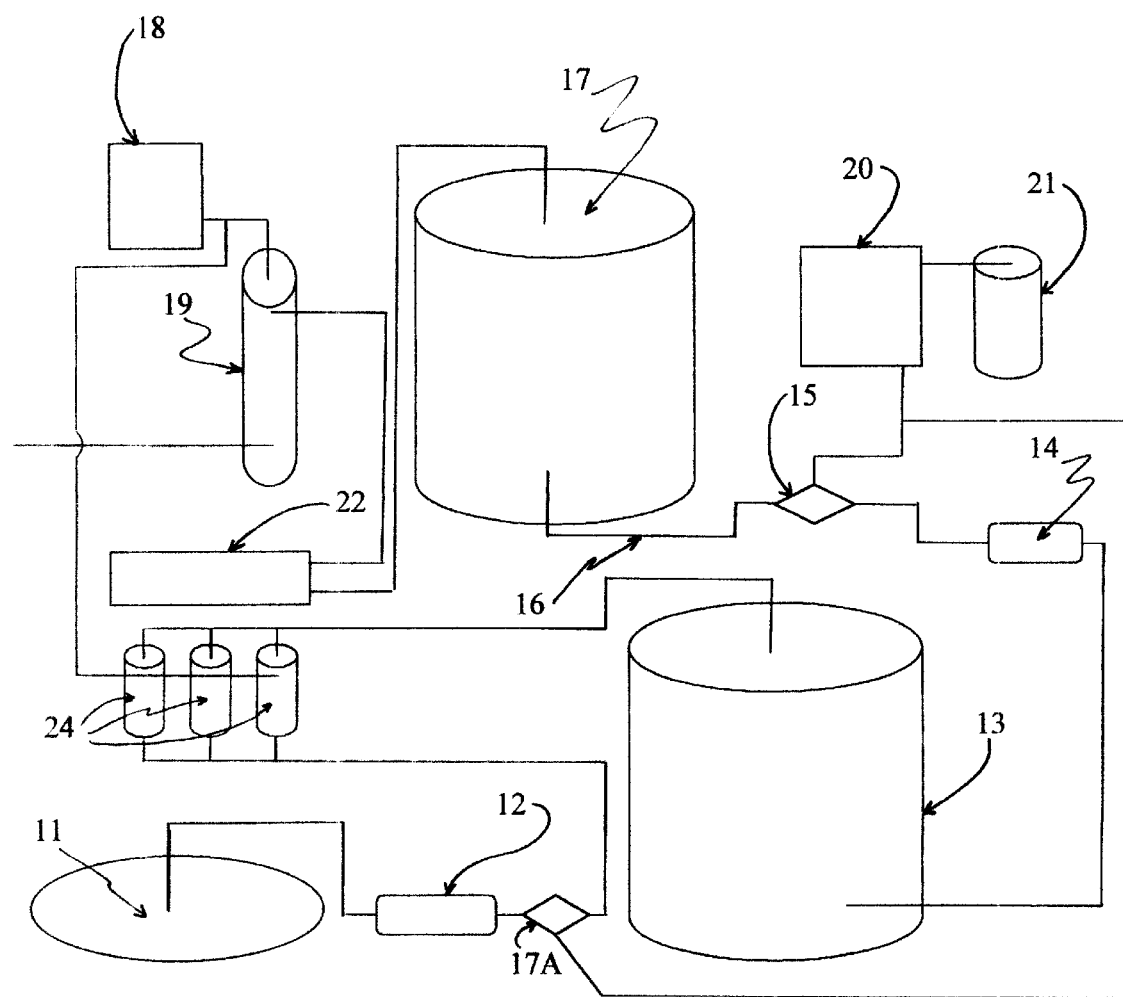
FIG. 5 illustrates a modification of the invention of FIG. 4 with carbon bed filters.

In yet another embodiment, as illustrated in FIG. 5, a carbon bed may be placed between the pressurized contact tank 17 and the second gas stripper 19 shown in FIG. 4. In this embodiment, the ozone containing water passing through the carbon bed 26 will destroy the MTBE on the carbon bed and prolong its useful life.

According to the process of the invention, water contaminated with MTBE is treated with an oxidizing gas or fluid containing air and/or ozone, preferably in the form of microbubbles. The treated water is then stripped of the oxidation products of MTBE and any ozone. The stripped oxidation by products are either destroyed or passed into the atmosphere. Depending upon the concentration of MTBE, any remaining MTBE is further treated with an oxidizing gas. Passing the oxidized water into a pressurized container not only maintains the microbubbles but also aids in the oxidation reaction.

The MTBE contaminated water can be passed through a carbon bed so as to remove MTBE from the water. Passing ozone or ozone enriched gas through MTBE contaminated carbon beds will oxidize the MTBE residue and rejuvenate the carbon beds. More than one carbon bed can be utilized at any step in the process and/or as a final treatment.

Venturis are preferably utilized when mixing the oxidizing gas or ozone and the water since they aid in providing a pressure to use in conjunction with the stripping apparatus or to overcome the pressure in the pressurized container.

The present invention may be embodied in other specific forms without departing from its spirit or essence. Accordingly, reference should be made to the claims rather than the foregoing specification as indicating the scope of the invention.

EXAMPLES

A series of tests were conducted using the apparatus of FIG. 1 in the invention. These involved exposing water samples containing MTBE to air alone and to ozone for varying durations. The tests were conducted to study the optimal exposure times and air/ozone combinations to create the greatest reduction in MTBE contamination. The results were as follows:

| SAMPLE NUMBER | MINUTES EXPOSURE AIR | MINUTES EXPOSURE OZONE | RESULTS MTBE-ppb | RED. % |
|---|---|---|---|---|
| MTBE concentration 500-ppb | | | | |
| CONTROL | 0 | 0 | 480 | 4.00% |
| 2 | 30 | 0 | 439 | 12.20% |
| 3 | 60 | 0 | 360 | 28.00% |
| 4 | 60 | 60 | 113 | 77.40% |
| 5 | 60 | 100 | 73 | 85.40% |
| 6 | 60 | 120 | 37 | 92.60% |
| MTBE concentration 255-ppb | | | | |
| CONTROL | 0 | 0 | 248 | 3.00% |
| 1 | 15 | 0 | 48 | 81.18% |
| 2 | 0 | 60 | 0 | 100.00% |
| 3 | 0 | 15 | 6 | 97.65% |
| 4 | 15 | 15 | 0 | 100.00% |
| MTBE concentration 5000-ppb | | | | |
| CONTROL | 0 | 0 | 4,800 | 4.00% |
| 1 | 10 | 0 | 4,678 | 6.44% |
| 2 | 10 | 15 | 3,149 | 37.02% |
| 3 | 10 | 30 | 1881 | 62.38% |
| 4 | 0 | 120 | 0 | 100.00% |

Conclusion

Air alone for the time of exposure is not as effective as ozone alone to destroy the MTBE. Ozone alone is effective at lower levels of contamination of MTBE. The combination of air and ozone reduced the time of exposure.

The stripping apparatus aids in the removal of MTBE.

What is claimed is:

1. A process for the removal of methyl-tert butyl ether from methyl-tert butyl ether contaminated water comprising the operation of contacting said contaminated water with a sufficient amount of ozone under pressure to oxidize the methyl-tert butyl ether and then stripping the oxidized products from the water.

2. A process for the removal of methyl-tert butyl ether from methyl-tert butyl ether contaminated water comprising the steps of:

1) introducing an oxidizing fluid selected from the group consisting of, ozone and ozone enriched air into a flow stream of methyl-tert butyl ether contaminated water;

2) passing the stream from step 1) into a pressurized container; and then 3) stripping methyl-tert butyl ether and ozone from the water from step 2).

3. The process of claim 2 wherein said oxidizing fluid is passed into said stream through a venturi means.

4. The process of claim 2 wherein the methyl-tert butyl ether oxidation products and ozone stripped in step 3) are passed through a means for destroying methyl-tert butyl ether oxidation products and residual ozone.

5. The process of claim 2 wherein said oxidizing fluid is in the form of microbubbles.

6. The process of claim 2 wherein said pressurized container has a pressure of about 10 to 30 psi.

7. The process of claim 2 including the step of contacting at least one stripping column with said contaminated water to strip methyl-tert butyl ether from said contaminated water prior to step 1).

8. The process of claim 2 including the step of filtering said stream from step 3) through a carbon bed.

9. The process of claim 2 wherein ozone remains in the water after completion of step 3) and said ozone is recycled to step 1).

* * * * *